9525X
S. UNDERWOOD.
CONVEYING BOATS OVER DAMS, &c.
Patented Mar. 19, 1836.
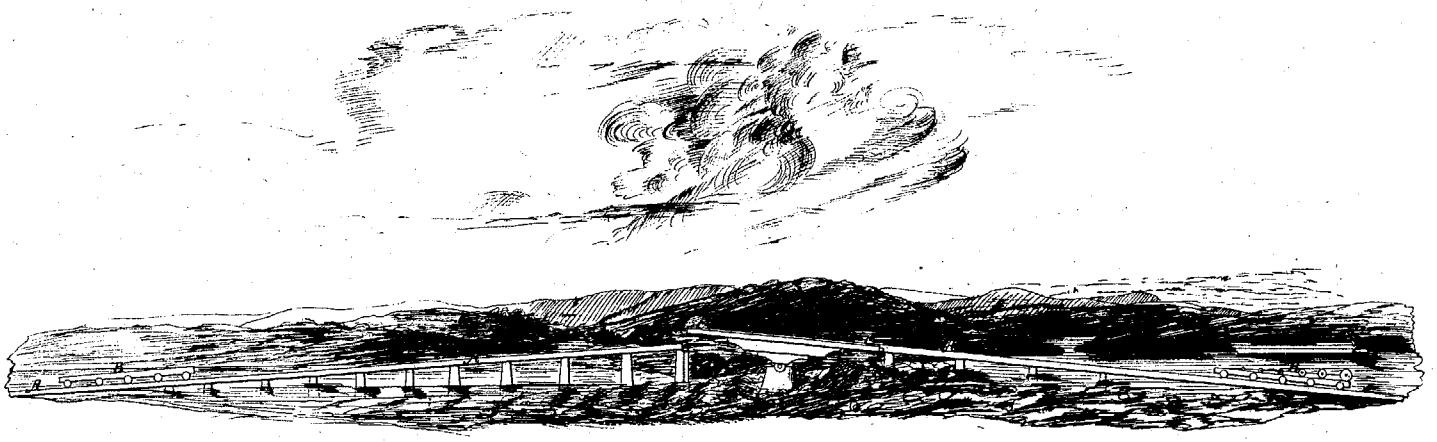
THE NORRIS PETERS CO., PHOTO-LITHO., WASHINGTON, D. C.

Stephen Underwood of Bath N. of Grafton State of Newhampshire.

Letters Patent

The Schedule referred to in these Letters Patent and making part of the same, containing a description in the words of the said Stephen Underwood himself, of his improvement "In the Machine for conveying Boats Rafts &c. over Dams, shoals, and other obstructions in rivers."

---

To all whom it may concern, Be it known, that I Stephen Underwood of Bath in the County of Grafton and State of New Hampshire, have invented an improvement in the means of an apparatus for the conveying of Rafts and Boats and so forth over Dams, sluices shoals or shoals in rivers, and do hereby declare that the following is a full and exact description thereof - I construct two inclined planes, rail ways, which are to be made and fixed, in the manner of the well-known marine railways for hauling vessels out of water for repairs. I also construct a car, carriage, or cradle, which is to run upon trucks, wheels or rollers in a manner also similar to those used for receiving vessels to be drawn upon marine railway - One of the before named railways is to be constructed and fixed above the dam or other obstruction its lower end being up stream, and so far below the surface of the water as may be required to float the raft or other load, on to the car or carriage which is then to stand thereon the other railway is to be below the dam and so forth inclining down stream and in all other respects constructed like that first named. The length of these railways must vary so as to adapt them to the situation in which they are to be placed, and this will be governed by the depth of the water, the height of the obstruction, and the inclination which must be given to cause the power applied to be sufficient to raise the load - Should there be no ascending traffic, the inclination of the lower may exceed that of the upper railway.

The upper ends of these railways are to be on the same horizontal line or nearly so, but they are not to meet together by the whole distance occu-
pied by the length of the car or carriage, which is to sustain the load, say
thirty feet more or less, according to circumstances - This distance is to be oc-
cupied by what I denominate a vibrating railway, which so far as the rails
are concerned, has its upper surface constructed like that of the inclined
planes, so that the car, or carriage may run thereon - The timbers of which
it is composed must be strongly framed together and so stout that they
will sustain the car and its load without sensibly yielding when it has
no support but that of the shaft or gudgeons, upon which it is closely sus-
tained at its centre - The vibrating railway is elevated above the level
of the upper ends of the inclined planes, and turns upon gudgeons formed
by the terminations of a shaft, which crosses it at the centre - The boxes,
or bearings for these gudgeons must of course be firmly fixed, as they also
are to bear the whole weight of the car and its load - The vibrating rail-
way is so adjusted that it will tilt towards either of the inclined planes,
will adapt its rails to, and form a junction with them, at their own incli-
nation - I do not think it necessary to describe any particular mode
of drawing the car with its load up the inclined plane, as this will
be done by manual, animal, water or other power, according to circum-
stances, and as any good machinist will be able to devise this part of
the structure - As it is sometimes necessary to cause the loading to lie
horizontally upon the car as it ascends and descends the inclined
planes, and to adapt the bearing surface of it to the inclination and
[illegible] of the load, I place round beams across the car, which
beams are the bearing timbers of the load, these rest and turn upon
gudgeons at their ends, the gudgeons being attached to the beams, when
the latter are turned by means of a handspike or otherwise, the load
will be sustained by them in any required position - I intend also to
use cars for conveying boats, the bodies of which shall be water tight
boxes, into and out of which the boats may be floated - Having thus
fully described my said invention and the manner in which the same
is to be used, I do hereby declare that it consists exclusively in that
part of the apparatus employed, which I have denominated, the vibrating railway which is intended to winch the loads at the summit of the inclined planes, and to be adapted, by its rotatory motion to the plane of either, for the purpose, and in the manner, by me set forth; and I do further declare that I do not intend to confine myself to any particular mode of constructing the said vibrating railway and its appendages but to vary the same as I may think proper, while I attain the deem ends by adapting such a railway to the ascending and descending planes.

Witness
B. K. Morsell }
James Bowen }

Stephen Underwood 936 words]

Patented 19 March 1836 [illegible]

Rec.d & [illegible] anew April 25. 1837.

[illegible]